W. L. HEIM.
GALVANIC CELL.
APPLICATION FILED FEB. 28, 1908.
919,010.
Patented Apr. 20, 1909.
FIG. I.
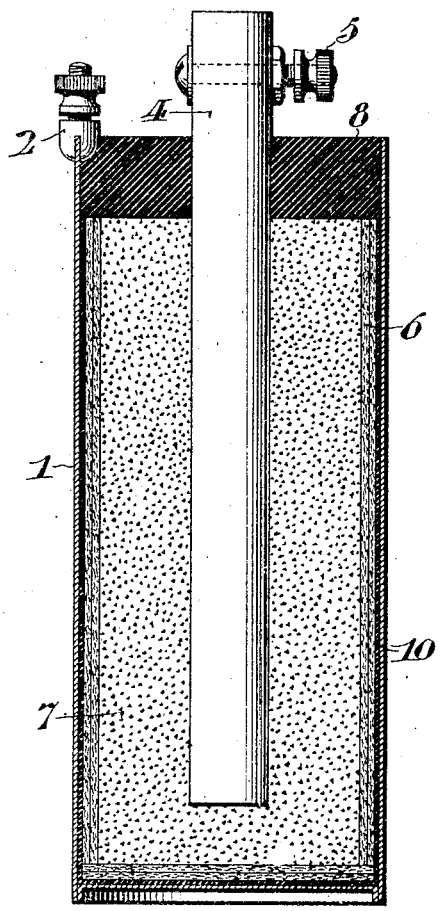
FIG. II.
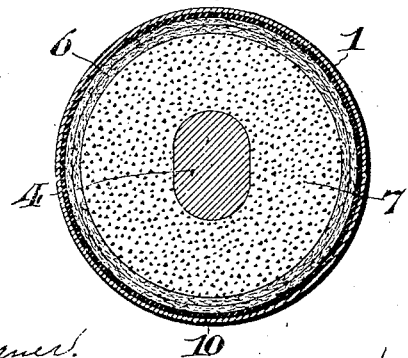
WITNESSES:
John C. Bergner
Wm. J. Sperl
INVENTOR:
WILLIAM L. HEIM,
by his Attorneys
Huey & Paul

UNITED STATES PATENT OFFICE.

WILLIAM L. HEIM, OF KANE, PENNSYLVANIA.

GALVANIC CELL.

No. 919,010.  Specification of Letters Patent.  Patented April 20, 1909.

Application filed February 28, 1908. Serial No. 418,256.

*To all whom it may concern:*

Be it known that I, WILLIAM L. HEIM, of Kane, in the county of McKean and State of Pennsylvania, have invented certain new and useful Improvements in Galvanic Cells, whereof the following is a specification, reference being had to the accompanying drawings.

My invention relates to an improvement in galvanic cells, and principally to those in which the contents are saturated with a liquid electrolyte and which are commonly denominated "dry" cells, consisting of a metal container, an electrolyte and a central electrode.

The object of my invention is to prevent or hinder deterioration in such cells caused by the action of the electrolyte on the metallic container, while such cells are held in stock by a dealer or by a purchaser, and prior to their actual use.

In the accompanying drawings, Figure I, is a longitudinal vertical sectional view of a galvanic battery cell embodying my invention, the central electrode being shown in outline. Fig. II, is a horizontal sectional view of the cell.

In said drawings, the outer shell or container 1, is made of a thin metal, which forms one electrode of the cell, and in this instance, may be of zinc, and provided at its upper end with a binding post 2. The other electrode 4, may be carbon and provided with a binding post 5.

Within the container 1, is a porous lining 6, which may consist of one or more concentric layers of porous paper as is common in cells of this description. Between the porous lining and the inner electrode, a depolarizing agent electrolyte and conducting filler 7, is placed, and the top of the cell is sealed in the usual manner, by means of the plug 8, which renders the cell impervious to the action of external atmosphere and thereby prevents leakage and evaporation. The porous lining 6, is saturated with the exciting compound or electrolyte, which, in the present instance, may consist of a dissolved mixture of ammonium chlorid and zinc chlorid, although other kinds of electrolyte may be used.

Thus far I have described a known type of dry cell, to which my invention is applicable. It will be understood that it is also applicable to other types of cells. It has been found that cells constructed as above set forth, are liable to deterioration, when kept for any considerable time, without use, as for example, upon the shelves of a dealer. For this reason, I provide a removable insulating medium between the electrolyte and one of the electrodes, in this instance, the outer electrode which also serves as the container, and thus prevent or hinder the deterioration due to the action of the electrolyte upon the container. A suitable and efficient means for accomplishing this purpose, is to coat the inside of the container with a thin coating of paraffin 10, or other waxy insulating substance which remains solid at atmospheric or normal temperatures, which extends between the container and the porous lining 6. This lining 10, extends around the sides, and over the bottom of the container, thus separating and totally or partially insulating the electrolyte from the container, so that so long as it remains in place the deterioration of the cell is prevented or hindered.

When it is desired to use the cell, it is merely necessary to gently heat the same in order to melt the paraffin, which will then rise to the top of the electrolyte, thus causing the container to present an inner surface in condition to be acted upon by the electrolyte in the usual manner. As one means for melting the paraffin, the container may be placed in hot water of sufficiently high temperature to melt said paraffin. Obviously, other modes of heating are readily available, and will fall within the scope of my invention.

Although paraffin is given as an example of a substance suitable for insulation, it will be understood that I do not limit myself to this substance, since similar waxy substances, or indeed any insulating substance which is solid at ordinary temperature, but may be liquefied at an abnormal temperature which will not otherwise injure the cell, may be employed to accomplish my purpose.

The electrodes and the particular electrolyte above set forth are merely given as examples, as obviously other electrodes and electrolytes may be employed with equal advantage.

I am aware that paraffin has been used to coat steel or iron to protect it against rust, and that steel electrodes have been so coated as a protection against rust, prior to their use in a storage battery, as described in U. S. Patent No. 518,966, to Phillips & Entz, for a storage battery, but the paraffin was used in the Phillips battery primarily to prevent deterioration of the electrode by rust; whereas in my battery the paraffin has a different function, namely, to prevent the local action which impairs the value of a dry battery during the period preceding use. In brief, my invention consists in employing a paraffin coating in a dry galvanic cell when completely set up and in condition to generate current immediately upon the removal of said coating, in order that its electrical deterioration during the interval between the setting up of the cell and its actual use to generate current may be prevented, and this distinction is made clear in the claims by confining them to the use of the insulating coating in a dry galvanic cell, comprising electrolyte and electrodes in condition to generate current as soon as insulation is removed.

Having described my invention, I claim:

1. A dry galvanic cell comprising electrolyte and electrodes in condition to generate current as soon as insulation is removed, one of which electrodes is insulated in order to hinder its deterioration by action of the electrolyte, said insulation being removable by application of heat to the cell to render it available for use.

2. A dry galvanic cell comprising electrolyte and electrodes in condition to generate current as soon as insulation is removed, one of the electrodes being separated from the electrolyte by the interposition of an insulating medium, which is solid at normal temperatures, but which may be liquefied by a temporary abnormal temperature, and thereby displaced from its insulating position.

3. A dry galvanic cell, comprising a metal container, an electrolyte and an electrode, all combined in condition to generate current as soon as insulation is removed; and an insulating medium separating said container and electrolyte, which is effective at normal temperatures to hinder deterioration of the cell, but which may be removed at abnormal temperature.

4. A dry galvanic cell, comprising a metal container, a porous lining within said container, an electrolyte, and an electrode, all in condition to generate current as soon as insulation is removed, and a waxy insulating medium between said porous lining and said container, whereby deterioration of the cell is hindered, said insulating medium being removable by application of heat to permit the cell to generate current upon closure of the circuit.

5. A dry galvanic cell comprising electrodes and an electrolyte in condition to generate current as soon as insulation is removed, one of said electrodes being in the form of a container for the electrolyte, and being provided with a coating of paraffin upon its inner surface, which acts to wholly or partially insulate the electrolyte from said container at normal temperatures, but which may be removed by a temporary abnormal temperature.

In testimony whereof, I have hereunto signed my name, at Kane in the State of Pennsylvania, this twenty-fourth day of February, 1908.

WILLIAM L. HEIM.

Witnesses:
N. B. BUBB, Jr.,
L. F. SIEGEL.